US011342148B2

(12) United States Patent
Horikoshi et al.

(10) Patent No.: US 11,342,148 B2
(45) Date of Patent: May 24, 2022

(54) RELAY DEVICE AND CONTROL METHOD OF RELAY DEVICE

(71) Applicant: Marelli Corporation, Saitama (JP)

(72) Inventors: Kouichirou Horikoshi, Saitama (JP); Junya Tanaka, Saitama (JP)

(73) Assignee: Marelli Corporation, Saitama (JP)

( * ) Notice: Subject to any disclaimer, the term of this patent is extended or adjusted under 35 U.S.C. 154(b) by 0 days.

(21) Appl. No.: 17/310,379

(22) PCT Filed: Jan. 23, 2020

(86) PCT No.: PCT/JP2020/002368

§ 371 (c)(1),
(2) Date: Jul. 29, 2021

(87) PCT Pub. No.: WO2020/158577

PCT Pub. Date: Aug. 6, 2020

(65) Prior Publication Data

US 2022/0102101 A1 Mar. 31, 2022

(30) Foreign Application Priority Data

Jan. 30, 2019 (JP) ............................ JP2019-014800

(51) Int. Cl.
*H02M 3/335* (2006.01)
*H01H 47/32* (2006.01)
(Continued)

(52) U.S. Cl.
CPC .......... *H01H 47/325* (2013.01); *H01H 47/04* (2013.01); *H01H 47/18* (2013.01)

(58) Field of Classification Search
CPC ....... H01H 47/04; H01H 47/18; H01H 47/325
(Continued)

(56) References Cited

U.S. PATENT DOCUMENTS

| | | | | |
|---|---|---|---|---|
| 6,845,001 | B1 | 1/2005 | Kinbara | |
| 7,359,175 | B2 * | 4/2008 | Morita | H01H 47/04 361/160 |

(Continued)

FOREIGN PATENT DOCUMENTS

| | | | |
|---|---|---|---|
| JP | 2013084516 A | 5/2013 | |
| JP | 2013102560 A | 5/2013 | |
| WO | 0104922 A1 | 1/2001 | |

OTHER PUBLICATIONS

International Preliminary Report on Patentability of corresponding application PCT/JP2020/002368; dated Jul. 27, 2021; 9 pages.

(Continued)

*Primary Examiner* — Yemane Mehari
(74) *Attorney, Agent, or Firm* — Young Basile Hanlon & MacFarlane, P.C.

(57) ABSTRACT

A relay device includes a coil portion, a fixed contact, a spring, a moving contact and a drive circuit. The drive circuit controls the electromagnetic force of the coil portion to be a first electromagnetic force when switching the fixed contact and the moving contact in a contact state to a non-contact state. The drive circuit controls the electromagnetic force of the coil portion to be a second electromagnetic force that is larger than the first electromagnetic force after a lapse of a first time from start of control of the electromagnetic force of the coil portion to be the first electromagnetic force. The drive circuit controls the electromagnetic force of the coil portion to be reduced with time after a lapse of a second time from start of control of the electromagnetic force of the coil portion to be the second electromagnetic force.

17 Claims, 4 Drawing Sheets

(51) Int. Cl.
*H01H 47/18* (2006.01)
*H01H 47/04* (2006.01)

(58) Field of Classification Search
USPC .......................................................... 361/152
See application file for complete search history.

(56) References Cited

U.S. PATENT DOCUMENTS

| | | | | |
|---|---|---|---|---|
| 9,082,576 | B2 * | 7/2015 | Nishimura | H01H 1/34 |
| 9,097,766 | B2 * | 8/2015 | Kodama | G01R 31/3278 |
| 2014/0092517 | A1 * | 4/2014 | Sora | H01H 47/04<br>361/160 |
| 2021/0082646 | A1 * | 3/2021 | Kawaguchi | H01H 47/325 |

OTHER PUBLICATIONS

Office Action of corresponding application JP 2019-014800; dated Nov. 12, 2019; 3 pages with concise explanation.

* cited by examiner

RELAY DEVICE AND CONTROL METHOD OF RELAY DEVICE

CROSS-REFERENCE TO RELATED APPLICATION

This application claims priority to and benefit of Japanese Patent Application No. 2019-014800 filed on Jan. 30, 2019, the entire contents of which are incorporated herein by reference.

TECHNICAL FIELD

The present invention relates to a relay device and a control method of the relay device.

BACKGROUND

A relay device including a moving contact, a fixed contact and a coil has been known. In such a relay device, when the moving contact and the fixed contact in the contact state are switched to the non-contact state, the moving contact may hit the other member such as a stopper, or the like. If the impact generated by the moving contact hitting the other member is strong, noise may occur. Further, in such a relay device, when the moving contact and the fixed contact in the contact state are switched to the non-contact state, the moving contact and the fixed contact may deteriorate due to an arc discharge.

Thus, a relay device has been proposed in which noise generation is prevented when the moving contact and the fixed contact in the contact state are switched to the non-contact state, and deterioration of the moving contact and the fixed contact due to an arc discharge is also prevented (see, Patent Literature (PTL) 1).

The relay device disclosed in PTL 1 has two relays, each containing a moving contact and a fixed contact. In the relay device disclosed in PTL 1, when two relays are switched from the contact state (on state) to the non-contact state (off state), the moving contact and the fixed contact of one of the relays are put in the non-contact state, so that no current flows through the relay device. Further, in the relay device disclosed in PTL 1, after the relay device is put into a state where no current flows therethrough, the time interval required to switch the relay from the contact state to the non-contact state at the end is increased. In the relay device disclosed in PTL 1, damage to the moving contact and the fixed contact (contact portion) is prevented while noise generation is prevented by increasing the time interval required to switch the relay from the contact state to the non-contact state at the end.

CITATION LIST

Patent Literature

PTL 1: JP2013102560 (A)

SUMMARY

In the relay device disclosed in PTL 1, the relay that is switched from the on state to the off state at the end is prevented from generating noise by increasing the time interval required to switch the relay. However, in the relay device disclosed in PTL 1, the relay that is switched from the on state to the off state first is put in the off state suddenly. Thus, the moving piece of the relay that is switched from the on state to the off state first may collide with the stopper at a high speed, causing noise. Even in the case of the relay that is switched from the on state to the off state first, the time interval required to switch the relay may be increased to prevent noise generation. However, if the time required to switch the relay that is switched from the on state to the off state first is increased, its moving piece will slowly separate from the fixed piece while current is flowing through it. As a result, an arc discharge may occur.

It is therefore an object of the present invention to provide a relay device that prevents noise generation and arc discharge with a simpler configuration and a control method of the relay device.

A relay device according to a first aspect to solve the above described problem includes:

a fixed contact;

a moving contact;

a spring configured to apply an elastic force in a separating direction in which the moving contact separates from the fixed contact;

a stopper configured to regulate movement of the moving contact in the separating direction;

a coil portion configured to generate an electromagnetic force that moves the moving contact in an approaching direction in which the moving contact approaches the fixed contact through energization; and a drive circuit configured to control the electromagnetic force by controlling coil current flowing through the coil portion, wherein, the moving contact comes in contact with the fixed contact at a contact position, and movement is restricted by the stopper at a fully open position; the drive circuit controls:

the electromagnetic force to the moving contact to be reduced to a first electromagnetic force when switching the fixed contact and the moving contact in a contact state to a non-contact state;

the electromagnetic force to be a second electromagnetic force that is larger than the first electromagnetic force after a lapse of a first time from start of control of the electromagnetic force to be the first electromagnetic force;

the electromagnetic force to be reduced in stages after a lapse of a second time from start of control of the electromagnetic force to be the second electromagnetic force; and the electromagnetic force to be a predetermined electromagnetic force that is smaller than the second electromagnetic force, at a final stage, when the electromagnetic force is controlled to be reduced in stages, wherein the predetermined electromagnetic force is equal to or smaller than the elastic force applied by the spring having a spring constant of a lower limit value in a tolerance range of a spring constant of the spring, when the moving contact is present at the fully open position.

A control method of a relay device according to a second aspect to solve the above described problem is a control method of a relay device, the relay device including:

a fixed contact;

a moving contact;

a spring configured to apply an elastic force in a separating direction in which the moving contact separates from the fixed contact;

a stopper configured to regulate movement of the moving contact in the separating direction;

a coil portion configured to generate an electromagnetic force that moves the moving contact in an approaching direction in which the moving contact approaches the fixed contact through energization; and a drive circuit configured to control the electromagnetic force by controlling coil current flowing through the coil portion, wherein, the moving contact comes in contact with the fixed contact at a contact position, and movement is restricted by the stopper at a fully open position, the control method of the relay device including the steps of:

controlling, by the drive circuit, the electromagnetic force to the moving contact to be reduced to a first electromagnetic force, when the fixed contact and the moving contact in a contact state are switched to a non-contact state;

controlling, by the drive circuit, the electromagnetic force to be a second electromagnetic force that is larger than the first electromagnetic force after a lapse of a first time from start of control of the electromagnetic force to be the first electromagnetic force;

controlling, by the drive circuit, the electromagnetic force to be reduced in stages after a lapse of a second time from start of control of the electromagnetic force to be the second electromagnetic force; and controlling, by the drive circuit, the electromagnetic force to be a predetermined electromagnetic force that is smaller than the second electromagnetic force, at a final stage, when the electromagnetic force is controlled to be reduced in stages, wherein the predetermined electromagnetic force is equal to or smaller than the elastic force applied by the spring having a spring constant of a lower limit value in a tolerance range of a spring constant of the spring, when the moving contact is present at the fully open position

Advantageous Effect

According to the relay device of the first aspect, noise generation can be prevented, and arc discharge can be prevented as well.

According to a control method of the relay device of the second aspect, noise generation can be prevented, and an arc discharge can be prevented as well.

DETAILED DESCRIPTION

An embodiment according to the present invention will be described below with reference to the drawings.

[Configuration Example of Relay Device]

Figure 1:
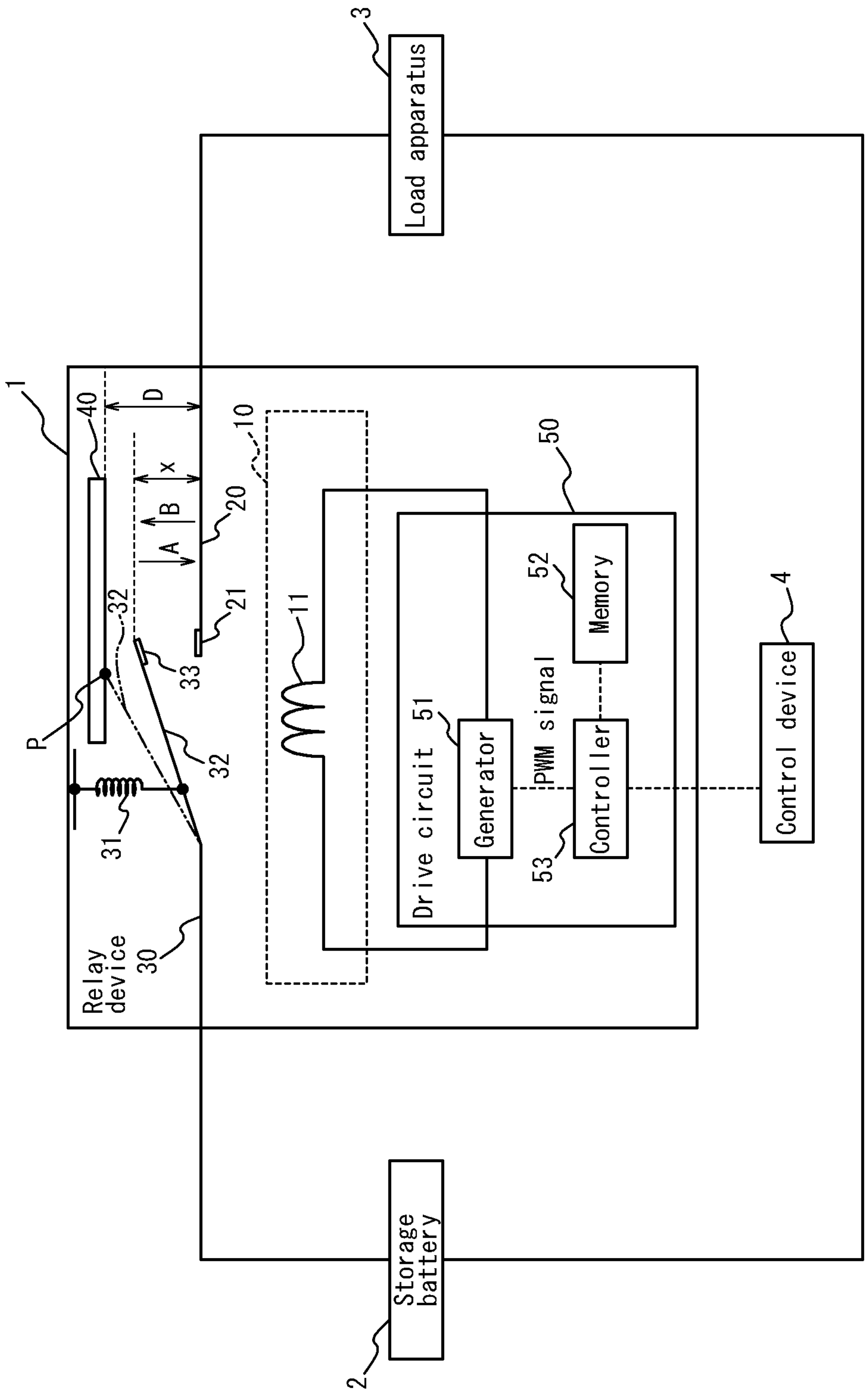
FIG. 1 is a block diagram illustrating a configuration example of a relay device according to an embodiment.

FIG. 1 is a block diagram illustrating a configuration example of a relay device 1 according to an embodiment. In FIG. 1, the solid lines connecting each functional block indicate the flow of power. Further, in FIG. 1, the dashed lines connecting each functional block indicate the flow of control or communication. The relay device 1, a storage battery 2, a load apparatus 3, and a control device 4 may be incorporated into one device (for example, a vehicle).

The relay device 1 is disposed between the storage battery 2 and the load apparatus 3. However, the relay device 1 may be disposed between any devices. The relay device 1 electrically connects or disconnects the storage battery 2 and the load apparatus 3 on the basis of control of the control device 4.

The storage battery 2 can supply charged power to the load apparatus 3 via the relay device 1. The load apparatus 3 consumes the power supplied from the storage battery 2 via the relay device 1.

The control device 4 is configured by including a microcomputer. The control device 4 outputs an on signal and an off signal to the relay device 1. The on signal is a signal that causes the devices connected to the relay device 1 (the storage battery 2 and the load apparatus 3) to be electrically connected. The off signal is a signal that causes the devices connected to the relay device 1 (the storage battery 2 and the load apparatus 3) to be electrically disconnected.

The relay device 1 includes a coil portion 10, a terminal board 20, a fixed contact 21, a terminal board 30, a spring 31, a moving piece 32, a moving contact 33, a stopper 40 and a drive circuit 50. The fixed contact 21 and the moving contact 33 are also collectively referred to as a "contact portion."

When energized, the coil portion 10 generates an electromagnetic force that moves the moving contact 33 toward the fixed contact 21. For example, the coil portion 10 generates an electromagnetic force that moves the moving contact 33 in the approaching direction A. The approaching direction A is a direction in which the moving contact 33 approaches the fixed contact 21.

The coil portion 10 is configured by including a coil 11. The coil portion 10 may include a bobbin, a stator, a yoke, and the like, in addition to the coil 11. The bobbin may be made of a resin material. The stator and the yoke may be made of a magnetic material.

The coil 11 may be a lead wire. The coil 11 may be wound onto the bobbin. A stator may be inserted into the coil 11. Both ends of the coil 11 may be connected to the drive circuit 50. Current is applied to the coil 11 by the drive circuit 50. When the coil 11 is energized, a magnetic path is formed through the stator and the yoke, and the like. When the magnetic path is formed, an electromagnetic force that moves the moving contact 33 in the approaching direction A is generated.

The terminal board 20 may be made of a conductive material. One end of the terminal board 20 is connected to the load apparatus 3. The other end of the terminal board 20 is provided with the fixed contact 21.

The fixed contact 21 may be made of a conductive material. The fixed contact 21 may be formed integrally with the terminal board 20. The fixed contact 21 is provided at a position facing the moving contact 33.

The terminal board 30 may be made of a conductive material. One end of the terminal board 30 is connected to the storage battery 2. The other end of the terminal board 30 is connected to the moving piece 32.

The spring 31 may be a coil spring. However, the spring 31 is not limited to a coil spring. The spring 31 may be a leaf spring, for example.

One end of the spring 31 is connected to the moving piece 32. The other end of the spring 31 is connected to a housing, and the like, of the relay device 1. The spring 31 applies an elastic force to the moving contact 33 in the separating direction B. The separating direction B is the direction in which the moving contact 33 separates from the fixed contact 21.

The magnitude of the elastic force of the spring 31 can depend on the magnitude of the spring constant of the spring 31, and the like. For example, the elastic force F1 is expressed by the following equation (1).

$$F1 = k \times (C - x) \quad \text{Equation (1)}$$

In Equation (1), the spring constant k is a spring constant of the spring 31. The displacement x is a displacement of the moving contact 33 from the fixed contact 21. The constant C is an element determined on the basis of the length (natural length), etc. of the spring 31 when no load is applied to the spring 31. It is to be noted that the constant C is longer than the distance D. The distance D is a distance from the fixed contact 21 to the stopper 40.

The elastic force of the spring 31 can increase as the spring constant of the spring 31 increases. The elastic force of the spring 31 can decrease as the spring constant of the spring 31 decreases. In this embodiment, the spring constant of the spring 31 has a value in the tolerance range.

Hereinafter, the spring 31 having a spring constant of the lower limit value in the tolerance range (that is, a spring having a small elastic force) is also described as "spring 31L." Further, the spring 31 having a predetermined spring constant value in the tolerance range is also described as "spring 31M." The predetermined value may be a value excluding the upper limit value and the lower limit value in the tolerance range. It is to be noted that the predetermined value may be a median value in the tolerance range, although not limited thereto. Further, the spring 31 having a spring constant of the upper limit value in the tolerance range (that is, a spring having a large elastic force) is also described as "spring 31U."

The moving piece 32 may be made of a conductive material. The moving piece 32 is movable with respect to the terminal board 30. One end of the moving piece 32 is connected to the terminal board 30. The other end of the moving piece 32 is provided with the moving contact 33.

The moving contact 33 may be made of a conductive material. The moving contact 33 may be formed integrally with the moving piece 32. The moving contact 33 and the fixed contact 21 are in contact or non-contact state. The position where the moving contact 33 comes in contact with the fixed contact 21 is also referred to as "contact position."

For example, the moving contact 33 moves in the approaching direction A (that is, the direction in which the moving contact 33 approaches the fixed contact 21) when the electromagnetic force generated by the coil portion 10 is larger than the elastic force of the spring 31. The moving contact 33 comes in contact with the fixed contact 21 by moving in the approaching direction A. When the moving contact 33 and the fixed contact 21 are in the contact state, the storage battery 2 and the load apparatus 3 are electrically connected.

For example, the moving contact 33 moves in the separating direction B (that is, the direction in which the moving contact 33 separates from the fixed contact 21) when the electromagnetic force generated by the coil portion 10 is smaller than the elastic force of the spring 31. The moving contact 33 will be in non-contact with the fixed contact 21 by moving in the separating direction B. When the moving contact 33 and the fixed contact 21 are in not contact state, the storage battery 2 and the load apparatus 3 are electrically disconnected. It is to be noted that the moving contact 33 can abut the stopper 40 by continuing to move in the separating direction B. In other words, the movement of the moving contact 33 is regulated by the stopper 40 at the fully open position P.

Hereinafter, the moving contact 33 to which the elastic force of the spring 31L is applied is also described as "moving contact 33L." Further, the moving contact 33 to which the elastic force of the spring 31M is applied is also described as "moving contact 33M." Then, the moving contact 33 to which the elastic force of the spring 31U is applied is also described as "moving contact 33U."

The stopper 40 may be made of a metal member. The stopper 40 regulates the movement of the moving contact 33 in the separating direction B. The moving contact 33 can abut the stopper 40 when the moving contact 33 and the fixed contact 21 are in a non-contact state. The stopper 40 defines the fully open position P of the moving contact 33 with respect to the fixed contact 21 by abutting the moving contact 33. It is to be noted that, when the relay device 1 has no stopper 40, for example, the fully open position P of the moving contact 33 with respect to the fixed contact 21 may be defined by the other members.

The drive circuit 50 switches the coil portion 10 between the energized state and the non-energized state on the basis of the control of the control device 4. The drive circuit 50 includes a generator 51, a memory 52 and a controller 53.

The generator 51 is electrically connected to the coil 11 of the coil portion 10. The generator 51 includes a switching element, and the like. The generator 51 generates a coil current on the basis of control of the controller 53. The coil current is a current that flows through the coil portion 10, that is, the current that flows through the coil 11. In this embodiment, the generator 51 generates a coil current on the basis of the Pulse Width Modulation (PWM) control. In this embodiment, a PWM signal from the controller 53 is input to a switching element of the generator 51. The switching element of the generator 51 switches between on and off according to the duty ratio of the PWM signal. The switching element of the generator 51 switches according to the duty ratio of the PWM signal, and as a result a coil current according to the duty ratio of the PWM signal is generated.

Hereinafter, the "PWM signal cycle" is assumed to be the sum of a period during which the switching element of the generator 51 is turned on and a period during which the switching element of the generator 51 is turned off. Further, the "PWM duty ratio" is a value obtained by dividing a period during which the switching element of the generator 51 is turned on by a PWM signal cycle. In this case, the larger the duty ratio of the PWM signal, the longer a period during which the switching element of the generator 51 is turned on, and as a result a coil current increases. That is, the larger the duty ratio of the PWM signal, the coil current increases, and the electromagnetic force of the coil portion 10 increases. Further, the smaller the duty ratio of the PWM signal, the shorter the period during which the switching element of the generator 51 is turned off, and thus the coil current decreases. That is, the smaller the duty ratio of the PWM signal, the lower the coil current, and the smaller the electromagnetic force of the coil portion 10.

The memory 52 is connected to the controller 53. The memory 52 stores the information acquired from the controller 53. The memory 52 may serve as a working memory of the controller 53. The memory 52 may store a program executed by the controller 53. The memory 52 may be a semiconductor memory. The memory 52 is not limited to a semiconductor memory, and may be a magnetic storage, or other storage media. The memory 52 may be contained in the controller 53 as a part of the controller 53.

The controller 53 controls each component of the relay device 1. The controller 53 may be a processor such as a Central Processing Unit (CPU) configured to execute a program that defines a control procedure. The controller 53 reads a program stored in the memory 52 to execute various programs.

The controller 53 can acquire an on signal from the control device 4. When acquiring an on signal, the controller 53 switches the fixed contact 21 and the moving contact 33 in the non-contact state to the contact state. At the time of this switching, the controller 53 outputs a PWM signal to the generator 51 to cause the generator 51 to generate a coil current. The controller 53 causes the generator 51 to generate a coil current to cause the coil portion 10 to generate an electromagnetic force. At this time, the controller 53 causes the coil portion 10 to generate an electromagnetic force that is larger than the elastic force of the spring 31. When the coil portion 10 generates the electromagnetic force, the moving contact 33 moves along the approaching direction A and comes in contact with the fixed contact 21. After bringing the moving contact 33 into contact with the fixed contact 21, the control unit 53 keeps the switching element of the generator 51 in the on state by setting the duty ratio of the PWM signal to 100%. The control unit 53 keeps the fixed contact 21 and the moving contact 33 in the contact state by keeping the switching element of the generator 51 in the on state.

Figure 2:
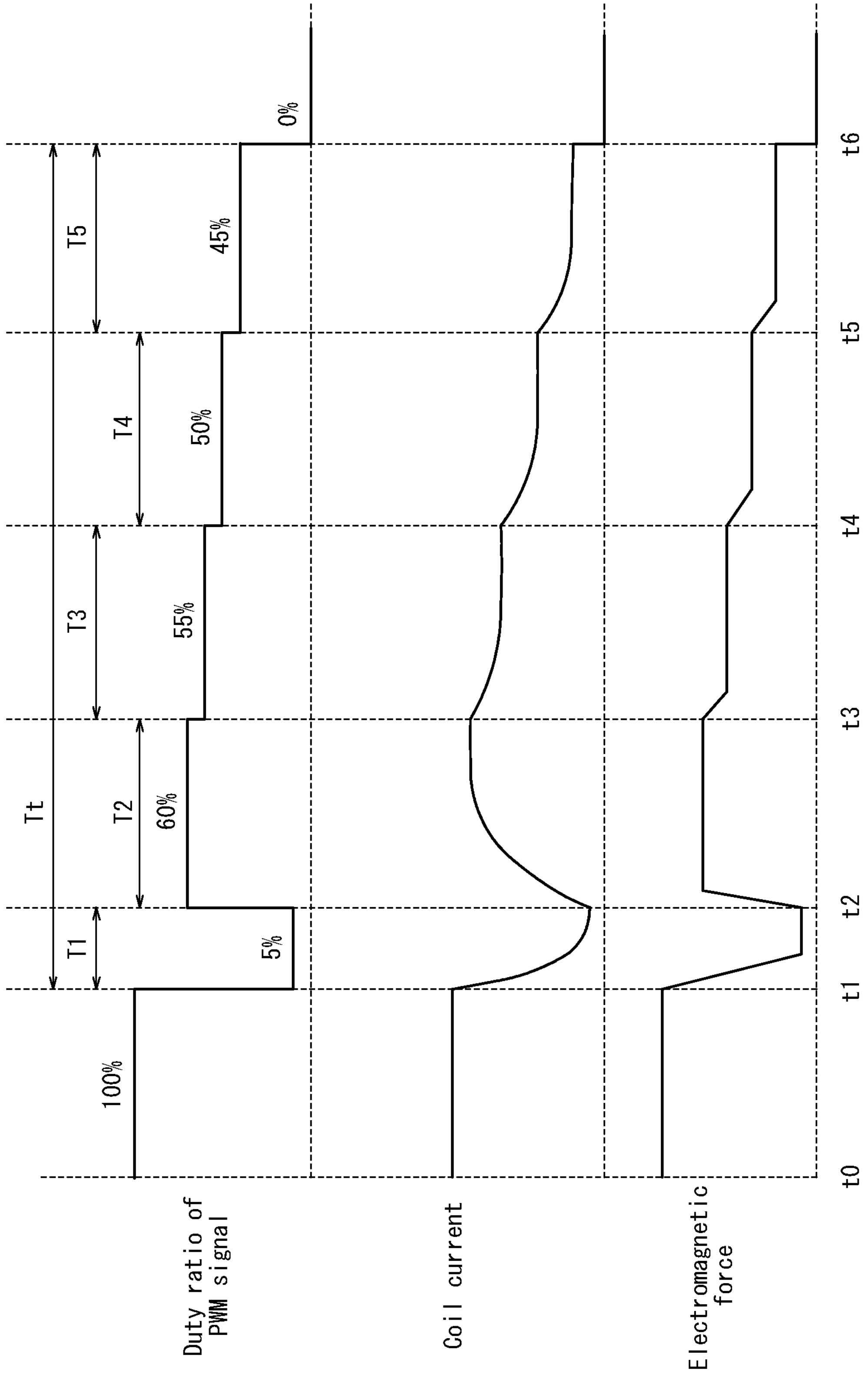
FIG. 2 is a timing chart illustrating operation of the relay device illustrated in FIG. 1.

FIG. 2 is a timing chart illustrating operation of the relay device 1 illustrated in FIG. 1. At the time t0 illustrated in FIG. 2, the fixed contact 21 and the moving contact 33 are in the contact state. At the time t0, the controller 53 keeps the switching element of the generator 51 in the on state by setting the duty ratio of the PWM signal to 100%.

Figure 3:
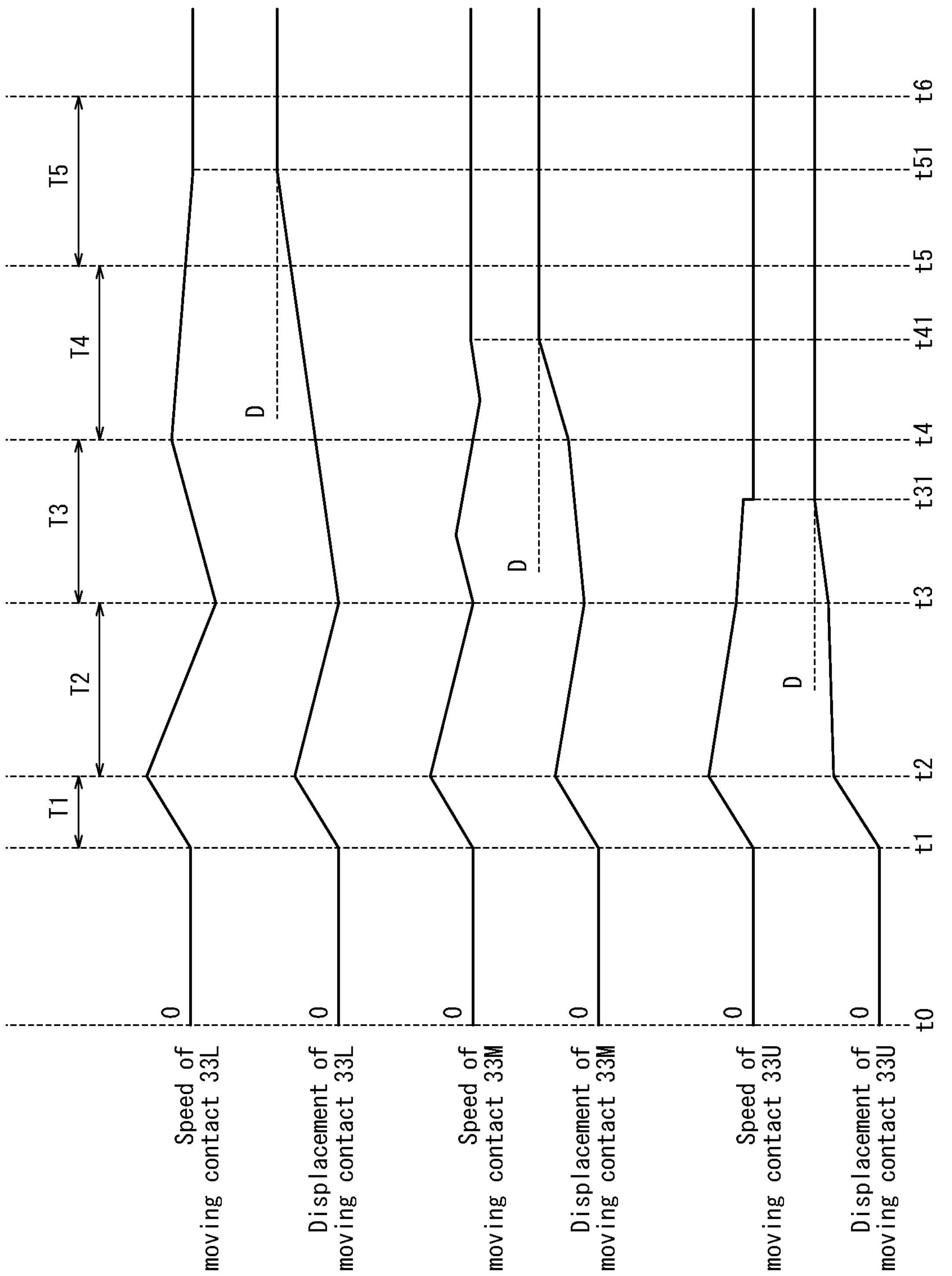
FIG. 3 is a timing chart illustrating speed and displacement of the moving contact illustrated in FIG. 1.

FIG. 3 is a timing chart illustrating the speed and the displacement of the moving contact 33. FIG. 3 illustrates the speed and the displacement of the moving contact 33L to which the elastic force of the spring 31L is applied, as an example of the moving contact 33 that is easy to move in the approaching direction A (difficult to move in the separating direction B) illustrated in FIG. 1. Further, FIG. 3 illustrates the speed and the displacement of the moving contact 33U to which the elastic force of the spring 31U is applied, as an example of the moving contact 33 that is easy to move in the separating direction B (difficult to move in the approaching direction A) illustrated in FIG. 1. Further, FIG. 3 illustrates the speed and the displacement of the moving contact 33M to which the elastic force of the spring 31M is applied, as a reference. The displacement of the moving contacts 33L, 33M and 33U illustrated in FIG. 3 is the displacement x from the fixed contact 21 illustrated in FIG. 1. At the time t0 illustrated in FIG. 3, all of the moving contacts 33L, 33M and 33U are in contact with the fixed contact 21. Thus, at the time t0 illustrated in FIG. 3, the displacements of the moving contacts 33L, 33M, and 33U are all 0. Further, when the moving contact 33 is in contact with the fixed contact 21, the moving contact 33 is in a fixed state. Thus, at the time t0 illustrated in FIG. 3, the speeds of all of the moving contacts 33L, 33M, and 33U are 0. In the timing chart illustrating the speed of the moving contact 33 in FIG. 3, the speed of the moving contact 33 in the separating direction B becomes faster toward the upper side in the figure. Further, in the timing chart illustrating the displacement of the moving contact 33 in FIG. 3, the moving contact 33 approaches the fully open position P toward the upper side in the figure.

The controller 53 can acquire an off signal from the control device 4. When acquiring the off signal, the controller 53 switches the fixed contact 21 and the moving contact 33 in the contact state to the non-contact state. At the time of this switching, the controller 53 controls the electromagnetic force generated by the coil portion 10 to be a first electromagnetic force. Specifically, the controller 53 outputs the PWM signal with a duty ratio corresponding to the first electromagnetic force to the generator 51. The first electromagnetic force may be set to be smaller than the elastic force applied by the spring 31L at least when the moving contact 33L is present at the contact position.

When the electromagnetic force of coil portion 10 is controlled to be the first electromagnetic force, the moving contact 33L to which the elastic force of the spring 31L is applied can move in the separating direction B and quickly separate from the fixed contact 21. Further, the moving contact 33M to which the elastic force of the spring 31M having a spring constant that is larger than that of the spring 31L is applied can also move in the separating direction B and quickly separate from the fixed contact 21. In the same manner, the moving contact 33U to which the elastic force of the spring 31U having a spring constant that is larger than that of the spring 31L is applied can also move in the separating direction B and quickly separate from the fixed contact 21. In this manner, the moving contact 33 quickly separates from the fixed contact 21, and as a result, the moving contact 33 and the fixed contact 21 can be prevented from being deteriorated by an arc discharge.

Here, the first electromagnetic force may be set to be smaller than the elastic force applied by the spring 31L when the moving contact 33L is present at the fully open position P. In this manner, by setting the first electromagnetic force to be smaller than the elastic force applied by the spring 31L, when the moving contact 33L is present at the fully open position P, the electromagnetic force generated by the coil portion 10 can be smaller. The smaller electromagnetic force generated by the coil portion 10 allows the moving contact 33 to be separated from the fixed contact 21 at a faster rate. Thus, arc discharge can be prevented more effectively by such a configuration. For example, the first electromagnetic force may be set to zero.

In the example illustrated in FIG. 2, the controller 53 acquires an off signal from the control device 4 at the time t1. At the time t1, the controller 53 controls the electromagnetic force to be the first electromagnetic force. For example, the controller 53 steps down the duty ratio of the PWM signal from 100% to 5%. In the example illustrated in FIG. 2, 5% of the duty ratio is the duty ratio corresponding to the first electromagnetic force. When the duty ratio of the PWM signal drops to 5%, the coil current is reduced and the electromagnetic force of the coil portion 10 will be the first electromagnetic force. When the electromagnetic force of the coil portion 10 will be the first electromagnetic force, as illustrated in FIG. 3, the speed of the moving contact 33L is increased after the time t1, and the displacement of the moving contact 33L will be larger than 0. That is, after the time t1, the moving contact 33L moves in the separating direction B and separates from the fixed contact 21. Further, as illustrated in FIG. 3, after the time t1, the moving contact 33M to which the elastic force of the spring 31M that is larger than that of the spring 31L is applied also moves in the separating direction B and separates from the fixed contact 21. In the same manner, the moving contact 33U to which the elastic force of the spring 31U that is larger than that of the spring 31L is applied also moves in the separating direction B and separates from the fixed contact 21.

Here, as a comparative example, it is assumed that control is made to continuously reduce the electromagnetic force of the coil portion from the time t1 illustrated in FIG. 2. In the comparative example, at the point in time when the elastic force of the spring acting in the separating direction in which the moving contact separates from the fixed contact and the electromagnetic force of the coil portion are balanced in the process of continuously reducing the electromagnetic force of the coil portion, the moving contact and the fixed contact are held in a state in which a minute gap is generated therebetween. As a result, an arc discharge generates for a longer period of time, which may cause the moving contact and the fixed contact to deteriorate.

On the other hand, in this embodiment, for example, at the time t1 illustrated in FIG. 2, the duty ratio of the PWM signal is stepped down from 100% to 5% (the first electromagnetic force). With the above described configuration, in this embodiment, the electromagnetic force of the coil portion 10 steeply drops to the first electromagnetic force. Thus, generation of an arc discharge for a longer period of time and resulting deterioration of the moving contact and the fixed contact as in the comparative example described above can be prevented.

Further, in this embodiment, when the electromagnetic force of the coil portion 10 steeply drops to the first electromagnetic force as described above, even if the spring 31 has any spring constant in the tolerance range, the moving contact 33 can separate from the fixed contact 21. With this configuration, even if the spring 31 has any spring constant in the tolerance range, the moving contact 33 and the fixed contact 21 can be prevented from being deteriorated by an arc discharge. However, the moving contact 33 (or a support member that supports the moving contact 33) may hit the stopper 40 when the speed of the moving contact 33 is kept after the moving contact 33 is separated from the fixed contact 21 at a high speed. When the moving contact 33 hits the stopper 40 and the like, noise may occur.

Thus, the controller 53 controls the electromagnetic force generated by the coil portion 10 to be the second electromagnetic force that is larger than the first electromagnetic force after a lapse of a first time from start of control of the electromagnetic force of the coil portion 10 to be the first magnetic force. Specifically, the controller 53 outputs a PWM signal with a duty ratio corresponding to the second electromagnetic force to the generator 51 after a lapse of the first time from start of control of the electromagnetic force of the coil portion 10 to be the first magnetic force.

The first time may be shorter than the time required for the moving contact 33U separating from the fixed contact 21 to reach the fully open position P by controlling the electromagnetic force of the coil portion 10 to be the first electromagnetic force. The first time may be determined experimentally. Further, the second electromagnetic force may be set to be larger than the elastic force applied by the spring 31U when the moving contact 33U is present at the fully open position P, and may be set to be smaller than the elastic force applied by the spring 31L when the moving contact 33L is present at the contact position.

In this embodiment, the moving contact 33U is prevented from moving toward the fully open position P by increasing the electromagnetic force of the coil portion 10 after a lapse of the first time. The moving contact 33U can be prevented from reaching the fully open position P at a certain high speed by preventing the moving contact 33U from moving to the fully open position P. Further, in the same manner, the moving contacts 33M and 33L can be prevented from reaching the fully open position P at a certain high speed by controlling the electromagnetic force of the coil portion 10 to be the second electromagnetic force, In the example illustrated in FIG. 2, the time t2 is the time at which the first time T1 has elapsed after start of control of the electromagnetic force of the coil portion 10 to be the first electromagnetic force by the controller 53. At the time t2, the controller 53 controls the electromagnetic force of the coil portion 10 to be the second electromagnetic force. For example, the controller 53 increases the duty ratio of the PWM signal to 60%. In the example illustrated in FIG. 2, the duty ratio of 60% is the duty ratio corresponding to the second electromagnetic force. When the duty ratio of the PWM signal is increased to 60%, a coil current is increased and as a result the electromagnetic force of the coil portion 10 will be the second electromagnetic force. At the time t2, which is the time after a lapse of the first time T1, the electromagnetic force of the coil portion 10 is increased, then the speed of the moving contact 33U is reduced, as illustrated in FIG. 3, and as a result the moving contact 33U can be prevented from reaching the fully open position P. Further, after the time t2, the electromagnetic force of the coil portion 10 will be the second electromagnetic force, and as a result, as illustrated in FIG. 3, the speeds of the moving contacts 33M and 33L are reduced, and the moving contacts 33M and 33L can be prevented from reaching the fully open position P.

As described above, in this embodiment, the electromagnetic force of the coil portion 10 is controlled to be the second electromagnetic force after a lapse of the first time, thus, even if the spring 31 has any spring constant in the tolerance range, the moving contact 33 can be prevented from reaching the fully open position P. That is, even if the spring 31 has any spring constant in the tolerance range, the moving contact 33 can be prevented from hitting the stopper 40 at a certain high speed. Such a configuration can prevent noise from being generated by the moving contact 33 hitting the stopper 40.

The controller 53 controls the electromagnetic force generated by the coil portion 10 to be reduced with time after a lapse of a second time from start of control of the electromagnetic force of the coil portion 10 to be a second electromagnetic force. In this embodiment, it is assumed that the controller 53 controls the electromagnetic force to be smaller in stages, after a lapse of the second time, on the basis of the tolerance range of the spring constant of the spring 31, although not limited thereto. The second time may be shorter than the time required to arrive at the contact position again, by controlling the electromagnetic force of the coil portion 10 to be the second electromagnetic force after the moving contact 33L of the spring 31L separates from the fixed contact 21. The moving contact 33L can be prevented from reaching the contact position during this second time. Further, the moving contacts 33U and 31M to which a larger elastic force is applied can also be prevented from reaching the contact position during the second time. The second time may be determined experimentally. With this configuration, the moving contact 33 can be prevented from coming in contact with the fixed contact 21 again.

At the first stage of reducing the electromagnetic force of the coil portion 10 in stages, the controller 53 controls, continuously for the third time, the electromagnetic force generated by the coil portion 10 to be a third electromagnetic force that is smaller than the second electromagnetic force. Specifically, the controller 53 outputs a PWM signal with a duty ratio corresponding to the third electromagnetic force to the generator 51, continuously for the third time. The third electromagnetic force may be set to be larger than the elastic force applied by the spring 31M when the moving contact 33M is present at the fully open position P, and may be set to be equal to or smaller than the elastic force applied by the spring 31U when the moving contact 33U is present at the fully open position P. For example, the third electromagnetic force is set to be larger than the calculated elastic force F1 by substituting a median value in the tolerance range for the spring constant k and substituting D for the distance x, in the above equation (1). Further, the third electromagnetic force may be set to be equal to or smaller than the calculated elastic force F1 by substituting an upper limit value in the tolerance range for the spring constant k and substituting D for the distance x, in the above equation (1). Further, the third time may be equal to or longer than the time required for the elastic force applied by the spring 31L to be balanced with the electromagnetic force of the coil portion 10. The third time may be determined experimentally. With this configuration, at the first stage, the moving contact 33U can reach the fully open position P. Further, out of the springs 31 having a spring constant in the range from the upper limit value to a predetermined value (for example, a median value) in the tolerance range of the spring constant, the moving contact 33 to which an elastic force is applied from the spring 31 that has an elastic force larger than the third electromagnetic force can reach the fully open position P. In this case, when the electromagnetic force of the coil portion 10 is controlled to be the third electromagnetic force, the moving contact 33U can hit the stopper 40 at a relatively low speed. When the moving contact 33U hits the stopper 40 at a low speed, the generated impact can be weakened, and as a result noise generation can be prevented.

In the example illustrated in FIG. 2, the time t3 is the time at which the second time T2 has elapsed from start of control of the electromagnetic force of the coil portion 10 to be the second electromagnetic force by the controller 53. At the time t3, the controller 53 starts controlling of the first stage. The controller 53 controls the electromagnetic force of the coil portion 10 to be the third electromagnetic force continuously for the third hour T3 from the time t3. For example, the controller 53 controls the duty ratio of the PWM signal to be 55% continuously for the third time T3. In the example illustrated in FIG. 2, 55% of the duty ratio is the duty ratio corresponding to the third electromagnetic force. When the duty ratio of the PWM signal drops to 55%, the coil current is reduced and the electromagnetic force of the coil portion 10 will be the third electromagnetic force. Thus, when the electromagnetic force of the coil portion 10 will be the third electromagnetic force, as illustrated in FIG. 3, after the time t3, the speed of the moving contact 33L will be slower than the speed during the first time T1. Further, as illustrated in FIG. 3, at the time t31, the displacement of the moving contact 33U is D. That is, at the time t31, the moving contact 33U reaches the fully open position P. At this time, the moving contact 33U can hit the stopper 40 at a relatively low speed. At the time t31, the moving contact 33U hits the stopper 40 at a low speed, thus the generated impact can be weakened, and noise generation can be prevented.

At the next stage following the first stage, the controller 53 controls the electromagnetic force generated by the coil portion 10 to be a fourth electromagnetic force that is smaller than the third electromagnetic force, continuously for the fourth time. Specifically, the controller 53 outputs a PWM signal with a duty ratio corresponding to the fourth electromagnetic force to the generator 51, continuously for the fourth time. The fourth electromagnetic force may be set to be larger than the elastic force applied by the spring 31L when the moving contact 33L is present at the fully open position P, and may be set to be equal to or smaller than the elastic force applied by the spring 31M when the moving contact 33L is present at the fully open position P. For example, the fourth electromagnetic force is set to be larger than the calculated elastic force F1 by substituting the lower limit value in the tolerance range for the spring constant k and substituting D for the distance x, in the above equation (1). Further, the fourth electromagnetic force is set to be equal to or smaller than the calculated elastic force F1 by substituting a predetermined value (e.g., a median value in the tolerance range) in the tolerance range for the spring constant k and substituting O for the distance x, in the above equation (1). Further, the fourth time may be equal to or larger than the time required for the elastic force applied by the spring 31L having a spring constant of the lower limit value to be balanced with the electromagnetic force of the coil portion 10. The fourth time may be determined experimentally. With this configuration, at the next stage, the moving contact 33M can reach the fully open position P. Meanwhile, the moving contact 33L can be held between the contact position and the fully open position P. Further, when the electromagnetic force of the coil portion 10 is controlled to be the fourth electromagnetic force, the moving contact 33M can hit the stopper 40 at a relatively low speed. When the moving contact 33M hits the stopper 40 at a low speed, the generated impact is weakened, and noise generation can be prevented.

In the example illustrated in FIG. 2, the time t4 is the time at which the third time T3 has elapsed, that is, the time when the first stage has finished. The controller 53 controls the electromagnetic force of the coil portion 10 to be the fourth electromagnetic force continuously for the fourth time T4 from the time t4. For example, the controller 53 controls the duty ratio of the PWM signal to be 50% continuously for the fourth time T4. In the example illustrated in FIG. 2, 50% of the duty ratio is the duty ratio corresponding to the fourth electromagnetic force. When the duty ratio of the PWM signal drops to 50%, the coil current is reduced and the electromagnetic force of the coil portion 10 will be the fourth electromagnetic force. When the electromagnetic force of the coil portion 10 will be the fourth electromagnetic force, as illustrated in FIG. 3, after the time t4, the speed of the moving contact 33M will be slower than the speed during the first time T1. Further, as illustrated in FIG. 3, at the time t41, the displacement of the moving contact 33M is D. That is, at the time t41, the moving contact 33M reaches the fully open position P. Further, out of the springs 31 having a spring constant in the tolerance range, the moving contact 33 to which an elastic force is applied from the springs 31 having an elastic force larger than the fourth electromagnetic force can reach the fully open position P. At this time, the moving contact 33M can hit the stopper 40 at a relatively low speed. At the time t41, when the moving contact 33U hits the stopper 40 at a low speed, the generated impact is weakened, and noise generation can be prevented.

At the final stage, the controller 53 controls the electromagnetic force generated by the coil portion 10 to be the fifth electromagnetic force, which is smaller than the fourth electromagnetic force, continuously for the fifth time. Specifically, the controller 53 outputs a PWM signal with the duty ratio corresponding to the fifth electromagnetic force to the generator 51 continuously for the fifth time. The fifth electromagnetic force may be set to be equal to or smaller than the elastic force applied by the spring 31L when the moving contact 33L is present at the fully open position P. For example, the fifth electromagnetic force is set to be equal to or smaller than the calculated elastic force F1 by substituting the lower limit value in the tolerance range for the spring constant k and substituting D for the distance x, in the above equation (1). Further, the fifth time may be equal to or longer than the time required for the moving contact 33L to reach the fully open position P. The fifth time may be determined experimentally. With this configuration, at the final stage, the moving contact 33L can reach the fully open position P. Further, by controlling the electromagnetic force of the coil portion 10 to be the fifth electromagnetic force, the moving contact 33L can hit the stopper 40 at a relatively low speed. When the moving contact 33L hits the stopper 40 at a low speed, the generated impact can be weakened, and noise generation can be prevented.

In the example illustrated in FIG. 2, at the time t5, the controller 53 starts control of the final stage. The controller 53 controls the electromagnetic force of the coil portion 10 to be the fifth electromagnetic force continuously for the fifth time T5 from the time t5. For example, the controller 53 controls the duty ratio of the PWM signal to be 45% continuously for the fifth time T5. In the example illustrated in FIG. 2, 45% of the duty ratio is the duty ratio corresponding to the fifth electromagnetic force. When the duty ratio of the PWM signal drops to 45%, a coil current is reduced and the electromagnetic force of the coil portion 10 will be the fifth electromagnetic force. When the electromagnetic force of the coil portion 10 will be the fifth electromagnetic force, as illustrated in FIG. 3, after time t5, the speed of the moving contact 33L can be slower than that during the first time T1. Further, as illustrated in FIG. 3, at the time t51, the displacement of the moving contact 33L can be D. That is, at the time t51, the moving contact 33L reaches the fully open position P. At this time, the moving contact 33L can hit the stopper 40 at a relatively low speed. When the moving contact 33L hits the stopper 40 at a low speed at the time t51, generated impact is weakened, and noise generation can be prevented.

As described above, in this embodiment, the electromagnetic force of the coil portion 10 is reduced in stages on the basis of the tolerance range of the spring constant of the spring 31. With such a configuration, the moving contact 33 can be slowly moved to the fully open position P with a large electromagnetic force for the spring 31 having a large elastic force, in the tolerance range of the spring constant. On the other hand, for the spring 31 having a small elastic force, the moving contact 33 can be slowly moved to the fully open position P with a small electromagnetic force. That is, even if the spring 31 has any spring constant in the tolerance range, the impact generated by the moving contact 33 hitting the stopper 40 is weakened, and noise generation can be prevented.

It is to be noted that the time required to switch the fixed contact 21 and moving contact 33 in the contact state to the non-contact state may be almost the same as the operating time, specified in the relay device 1, for electrically disconnecting a device connected to the relay device 1. For example, the time Tt from the time t1 to the time t6 illustrated in FIG. 2 may almost be the same as the operating time for electrically disconnecting the storage battery 2 and the load apparatus 3 illustrated in FIG. 1, specified in the relay device 1. In this case, the first time, the second time, the third time, the fourth time and the fifth time may be adjusted as appropriate on the basis of the specified operating time.

When switching the fixed contact 21 and the moving contact 33 to the non-contact state, the controller 53 keeps the switching element of the generator 51 in the off state by setting the duty ratio of the PWM signal to 0%. The controller 53 keeps the fixed contact 21 and the moving contact 33 in the non-contact state by keeping the switching element of the generator 51 in the off state.

[Operation Example of Relay Device]

Figure 4:
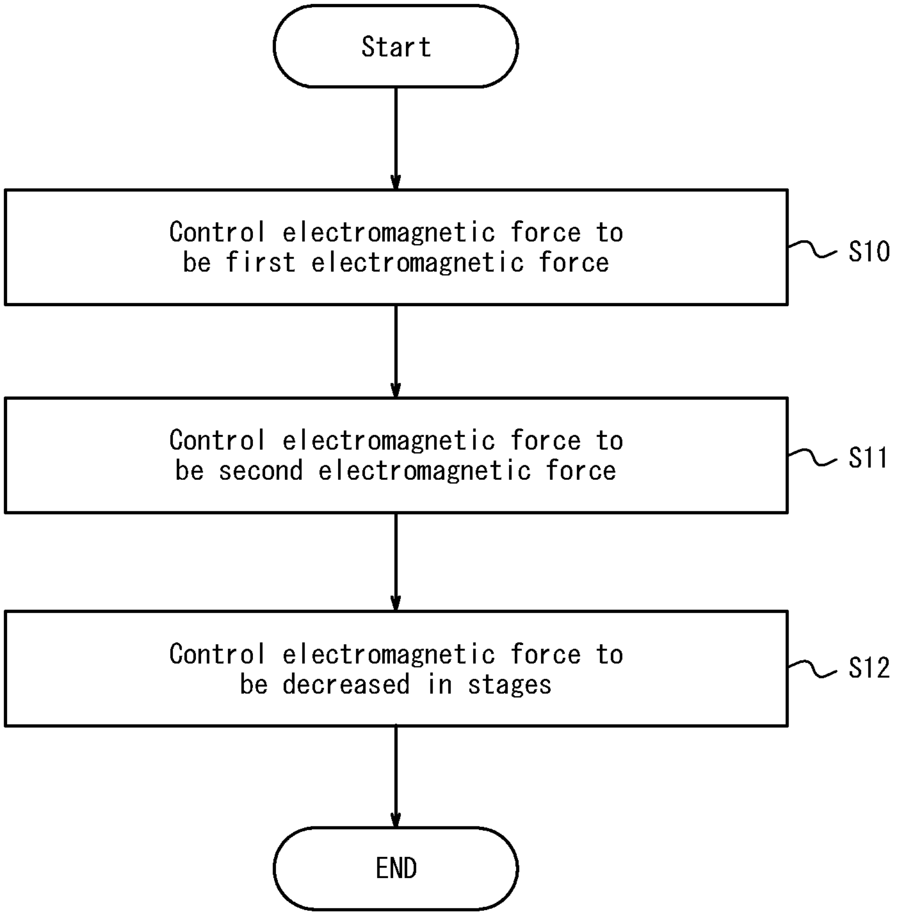
FIG. 4 is a flowchart illustrating operation of the relay device illustrated in FIG. 1.

FIG. 4 is a flowchart illustrating operation of the relay device 1 illustrated in FIG. 1. When acquiring an off signal from the control device 4, the controller 53 can start the process illustrated in FIG. 4.

The controller 53 controls the electromagnetic force generated by the coil portion 10 to be the first electromagnetic force (step S10).

The controller 53 controls the electromagnetic force generated by the coil portion 10 to be the second electromagnetic force after a lapse of the first time from start of the process of step S10 (step S11).

The controller 53 controls the electromagnetic force generated by the coil portion 10 to be reduced in stages on the basis of the tolerance range of the spring constant of the spring 31 after a lapse of the second time from start of the process of step S11 (step S12).

As described above, in the relay device 1 according to this embodiment, when the fixed contact 21 and the moving contact 33 in the contact state are switched to the non-contact state, the electromagnetic force of the coil portion 10 is controlled to be reduced in stages on the basis of the tolerance range of the spring constant of the spring 31. With such a configuration, even if the spring 31 has any spring constant in the tolerance range, noise generation caused by the moving contact 33 hitting the stopper 40 can be prevented.

Moreover, in the relay device 1 according to this embodiment, when the fixed contact 21 and the moving contact 33 in the contact state are switched to the non-contact state, the electromagnetic force of the coil portion 10 is controlled first to be the first electromagnetic force. When the electromagnetic force of the coil portion 10 is controlled to be the first electromagnetic force, the moving contact 33L to which the elastic force of the spring 31L having the spring constant of the lower limit value in the tolerance range is applied can quickly separate from the fixed contact 21. With such a configuration, even if the spring 31 has any spring constant in the tolerance range, deterioration of the moving contact 33 and the fixed contact 21 due to an arc discharge can be prevented.

In addition, in the relay device 1 according to this embodiment, as described above, deterioration of the moving contact 33 and the fixed contact 21 can be prevented while preventing noise generation, by controlling only one contact including the moving contact 33 and the fixed contact 21. Therefore, according to this embodiment, a relay device 1 and a control method of the relay device 1 can be provided, in which, with a simpler configuration, noise generation is prevented and deterioration of the moving contact 33 and the fixed contact 21 due to an arc discharge is prevented as well.

Although an embodiment of this disclosure has been described on the basis of the drawings and the examples, it is to be noted that various changes and modifications may be made easily by those who are ordinarily skilled in the art on the basis of this disclosure. Accordingly, it is to be noted that such changes and modifications are included in the scope of this disclosure. For example, functions and the like included in each function part can be rearranged without logical inconsistency, and a plurality of function parts can be combined into one or divided.

For example, in this embodiment, as a control to reduce the electromagnetic force of the coil portion 10 in stages, it has been described that the electromagnetic force of the coil portion 10 is reduced in three stages of the third electromagnetic force, the fourth electromagnetic force and the fifth electromagnetic force, although not limited thereto. The electromagnetic force of the coil portion 10 may be controlled to be reduced in stages on the basis of the tolerance range of the spring constant of the spring 31. Further, from the third time to the fifth time after a lapse of the second time, instead of reducing the electromagnetic force of the coil portion 10 in stages, it may be reduced continuously with time (reduction in a linear manner).

REFERENCE SIGNS LIST

1 Relay device
2 Storage battery
3 Load apparatus
4 Control device
10 Coil portion
11 Coil
20 Terminal board
21 Fixed contact
30 Terminal board
31, 31L, 31M, 31U Spring
32 Moving piece
33, 33L, 33M, 33U Moving contact
40 Stopper
50 Drive circuit
51 Generator
52 Memory
53 Controller

The invention claimed is:

1. A relay device, comprising:
a fixed contact;
a moving contact;
a spring configured to apply an elastic force in a separating direction in which the moving contact separates from the fixed contact;
a stopper configured to regulate movement of the moving contact in the separating direction;
a coil portion configured to generate an electromagnetic force that moves the moving contact in an approaching direction in which the moving contact approaches the fixed contact through energization; and
a drive circuit configured to control the electromagnetic force by controlling coil current flowing through the coil portion, wherein,
the moving contact comes in contact with the fixed contact at a contact position, and movement is restricted by the stopper at a fully open position;
the drive circuit controls:
the electromagnetic force to the moving contact to be reduced to a first electromagnetic force when switching the fixed contact and the moving contact in a contact state to a non-contact state;
the electromagnetic force to be a second electromagnetic force that is larger than the first electromagnetic force after a lapse of a first time from start of control of the electromagnetic force to be the first electromagnetic force;
the electromagnetic force to be reduced in stages after a lapse of a second time from start of control of the electromagnetic force to be the second electromagnetic force; and
the electromagnetic force to be a predetermined electromagnetic force that is smaller than the second electromagnetic force at a final stage when the electromagnetic force is controlled to be reduced in stages, wherein
the predetermined electromagnetic force is equal to or smaller than the elastic force applied by the spring having a spring constant of a lower limit value in a tolerance range of a spring constant of the spring, when the moving contact is present at the fully open position.

2. The relay device according to claim 1, wherein the first electromagnetic force is smaller than the elastic force applied by the spring having a spring constant of the lower limit value in the tolerance range, when the moving contact is present at the contact position.

3. The relay device according to claim 2, wherein the first electromagnetic force is smaller than the elastic force applied by the spring having a spring constant of the lower limit value in the tolerance range, when the moving contact is present at the fully open position.

4. The relay device according to claim 1, wherein the first time is time that is shorter than time required for the moving contact, which is separated from the fixed contact by controlling the electromagnetic force to be the first electromagnetic force and is applied an elastic force of the spring having a spring constant of an upper limit value in the tolerance range, to reach the fully open position.

5. The relay device according to claim 1, wherein, when the moving contact is present at the fully open position, the second electromagnetic force is larger than the elastic force applied by the spring having a spring constant of the upper limit value in the tolerance range, and when the moving contact is present at the contact position, the second electromagnetic force is smaller than the elastic force applied by the spring having a spring constant of the lower limit value in the tolerance range.

6. The relay device according to claim 1, wherein, the second time is shorter than time required for the moving contact to which an elastic force of the spring having a spring constant of the lower limit value in the tolerance range is applied separates from the fixed contact and then reaches the fixed contact again by controlling the electromagnetic force to be the second electromagnetic force.

7. The relay device according to claim 1, wherein, when controlling the electromagnetic force to be reduced in stages, the drive circuit controls, after a lapse of the second time, the electromagnetic force to be a third electromagnetic force which is smaller than the second electromagnetic force, continuously for a third time.

8. The relay device according to claim 7, wherein the third electromagnetic force is larger than the elastic force applied by the spring having a spring constant of a predetermined value in the tolerance range, when the moving contact is present at the fully open position, and is equal to or smaller than the elastic force applied by the spring having a spring constant of an upper limit value in the tolerance range, when the moving contact is present at the fully open position.

9. The relay device according to claim 7, wherein the third time is equal to or more than time required for the elastic force applied by the spring having a spring constant of the lower limit value in the tolerance range to be balanced with the electromagnetic force.

10. The relay device according to claim 7, wherein the drive circuit controls, after a lapse of the third time, the electromagnetic force to be a fourth electromagnetic force that is smaller than the third electromagnetic force, continuously for a fourth time.

11. The relay device according to claim 10, wherein the fourth electromagnetic force is larger than the elastic force applied by a spring having a spring constant of the lower limit value in the tolerance range, when the moving contact is present at the fully open position, and is equal to or smaller than the elastic force applied by the spring having a spring constant of a predetermined value in the tolerance range, when the moving contact is present at the fully open position.

12. The relay device according to claim 10, wherein the fourth time is equal to or greater than time required for the elastic force applied by the spring having a spring constant of the lower limit value in the tolerance range to be balanced with the electromagnetic force.

13. The relay device according to claim 8, wherein the predetermined value is a median value in the tolerance range.

14. The relay device according to claim 10, wherein, the drive circuit controls, when controlling the electromagnetic force to be reduced in stages, the electromagnetic force to be the predetermined electromagnetic force continuously for a fifth time, after a lapse of the fourth time.

15. The relay device according to claim 14, wherein the fifth time is equal to or greater than time required for the moving contact to which an elastic force of the spring having a spring constant of the lower limit value in the tolerance range is applied to reach the fully open position.

16. The relay device according to claim 1, wherein the drive circuit generates the coil current on the basis of Pulse Width Modulation (PWM) control.

17. A control method of a relay device, the relay device comprising:

a fixed contact;

a moving contact;

a spring configured to apply an elastic force in a separating direction in which the moving contact separates from the fixed contact;

a stopper configured to regulate movement of the moving contact in the separating direction;

a coil portion configured to generate an electromagnetic force that moves the moving contact in an approaching direction in which the moving contact approaches the fixed contact through energization; and a drive circuit configured to control the electromagnetic force by controlling coil current flowing through the coil portion, wherein, the moving contact comes in contact with the fixed contact at a contact position, and movement is restricted by the stopper at a fully open position, the control method of the relay device comprising the steps of: controlling, by the drive circuit, the electromagnetic force to the moving contact to be reduced to a first electromagnetic force, when switching the fixed contact and the moving contact in a contact state to a non-contact state;

controlling, by the drive circuit, the electromagnetic force to be a second electromagnetic force that is larger than the first electromagnetic force after a lapse of a first time from start of control of the electromagnetic force to be the first electromagnetic force;

controlling, by the drive circuit, the electromagnetic force to be reduced in stages after a lapse of a second time from start of control of the electromagnetic force to be the second electromagnetic force; and controlling, by the drive circuit, the electromagnetic force to be a predetermined electromagnetic force that is smaller than the second electromagnetic force at a final stage when controlling the electromagnetic force to be reduced in stages, wherein the predetermined electromagnetic force is equal to or smaller than the elastic force applied by the spring having a spring constant of a lower limit value in a tolerance range of a spring constant of the spring, when the moving contact is present at the fully open position.

* * * * *